(12) United States Patent
Suzuki et al.

(10) Patent No.: US 8,072,667 B2
(45) Date of Patent: Dec. 6, 2011

(54) OPTICAL SCANNING DEVICE AND IMAGE FORMING APPARATUS

(75) Inventors: Mitsuo Suzuki, Kanagawa (JP);
Atsufumi Omori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 241 days.

(21) Appl. No.: 12/396,623

(22) Filed: Mar. 3, 2009

(65) Prior Publication Data
US 2009/0231656 A1 Sep. 17, 2009

(30) Foreign Application Priority Data

Mar. 14, 2008 (JP) ................................. 2008-065707
Oct. 30, 2008 (JP) ................................. 2008-279569

(51) Int. Cl.
| | | |
|---|---|---|
| G02B 26/08 | (2006.01) | |
| G02B 26/10 | (2006.01) | |
| G02B 26/12 | (2006.01) | |
| H01J 3/14 | (2006.01) | |
| H01J 5/16 | (2006.01) | |
| H01J 40/14 | (2006.01) | |

(52) U.S. Cl. ..................................... 359/205.1; 250/236
(58) Field of Classification Search .... 359/196.1–226.3; 250/216, 234–236; 347/248
See application file for complete search history.

(56) References Cited

U.S. PATENT DOCUMENTS

| | | | |
|---|---|---|---|
| 4,726,640 A | 2/1988 | Iwama et al. | |
| 5,069,515 A | 12/1991 | Itami et al. | |
| 5,726,699 A | 3/1998 | Itami et al. | |
| 5,739,602 A | 4/1998 | Suzuki et al. | |
| 6,344,866 B1 * | 2/2002 | Komiya et al. | 347/133 |
| 6,346,701 B1 * | 2/2002 | Maruyama | 250/216 |
| 6,580,186 B1 | 6/2003 | Suzuki et al. | |
| 6,778,203 B2 | 8/2004 | Itami et al. | |
| 6,822,775 B2 | 11/2004 | Suzuki et al. | |
| 6,927,789 B2 | 8/2005 | Ozasa et al. | |
| 6,933,957 B2 | 8/2005 | Omori et al. | |
| 7,045,773 B2 | 5/2006 | Suzuki et al. | |
| 7,050,082 B2 | 5/2006 | Suzuki et al. | |
| 7,145,589 B2 * | 12/2006 | Amada et al. | 347/241 |
| 7,167,288 B2 | 1/2007 | Miyatake et al. | |
| 7,212,224 B2 | 5/2007 | Nihei et al. | |
| 7,256,815 B2 | 8/2007 | Suzuki et al. | |
| 7,271,824 B2 | 9/2007 | Omori et al. | |
| 7,327,379 B2 | 2/2008 | Nihei et al. | |
| 7,403,316 B2 | 7/2008 | Amada et al. | |
| 2005/0089069 A1 | 4/2005 | Ozasa et al. | |
| 2005/0219354 A1 | 10/2005 | Omori et al. | |
| 2006/0285186 A1 * | 12/2006 | Ishida et al. | 359/204 |
| 2007/0019269 A1 * | 1/2007 | Itabashi | 359/196 |
| 2007/0030548 A1 | 2/2007 | Nihei et al. | |

(Continued)

FOREIGN PATENT DOCUMENTS

JP 2005-37575 2/2005

(Continued)

Primary Examiner — Stephone Allen
Assistant Examiner — Kimberly N Kakalec
(74) Attorney, Agent, or Firm — Dickstein Shapiro LLP

(57) ABSTRACT

An optical scanning device includes a deflecting unit that deflects a laser beam from a light source in a main-scanning direction; a scanning imaging unit that focuses the laser beam deflected by the deflecting unit on a scanning surface and scans the scanning surface with focused laser beam; and a light receiving unit that detects optical intensity of the laser beam and a synchronous timing in the main-scanning direction and that includes a plurality of photodetecting elements arranged on a substrate in the main-scanning direction.

9 Claims, 13 Drawing Sheets

U.S. PATENT DOCUMENTS

| | | | |
|---|---|---|---|
| 2007/0035796 A1* | 2/2007 | Nakajima | 359/204 |
| 2007/0091163 A1 | 4/2007 | Omori et al. | |
| 2007/0132828 A1 | 6/2007 | Ishida et al. | |
| 2007/0206256 A1* | 9/2007 | Itabashi | 359/196 |
| 2007/0236557 A1 | 10/2007 | Imai et al. | |
| 2008/0055690 A1* | 3/2008 | Nakamura et al. | 359/203 |
| 2008/0068678 A1 | 3/2008 | Suzuki et al. | |
| 2008/0088889 A1* | 4/2008 | Suzuki | 358/480 |
| 2008/0088893 A1 | 4/2008 | Ishida et al. | |
| 2008/0123160 A1 | 5/2008 | Omori et al. | |
| 2008/0204846 A1* | 8/2008 | Itabashi et al. | 359/237 |
| 2008/0218813 A1 | 9/2008 | Tanabe et al. | |
| 2008/0225106 A1 | 9/2008 | Omori et al. | |
| 2008/0239336 A1 | 10/2008 | Tanabe et al. | |
| 2008/0291259 A1* | 11/2008 | Nihei et al. | 347/236 |
| 2009/0153933 A1* | 6/2009 | Tsuchiya et al. | 359/204.1 |

FOREIGN PATENT DOCUMENTS

| | | |
|---|---|---|
| JP | 3842004 | 8/2006 |
| JP | 2007-298563 | 11/2007 |

* cited by examiner

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document 2008-65707 filed in Japan on Mar. 14, 2008 and Japanese priority document 2008-279569 filed in Japan on Oct. 30, 2008.

BACKGROUND OF THE INVENTION

1. Field of the Invention

The present invention relates to an optical scanning device that scans a scanning surface with a light beam emitted from a light source including a plurality of light-emitting units for an image forming apparatus and an image forming apparatus including the same.

2. Description of the Related Art

A tandem-type color image forming apparatus is widely used as a color image forming apparatus such as a color laser printer.

As a color-image forming apparatus such as a color laser printer, a tandem-type color-image forming apparatus is known. The tandem-type color-image forming apparatus typically includes a plurality of optical scanning units each including a plurality of scanning imaging lenses. Each of the optical scanning units scans a corresponding photosensitive element as a scanning surface, which is driven to rotate by a driving unit, with a laser beam to write image data of a corresponding color on the photosensitive element thereby forming an electrostatic latent image. The electrostatic latent image is developed into a toner image of the corresponding color by a developing unit. Then, toner images of different colors are transferred onto a printing sheet in a superimposed manner, thereby forming a full color image on the printing sheet.

Each of the optical scanning units emits laser beams with predetermined intervals therebetween from a semiconductor laser unit that is controlled to drive based on image signals of each color. The laser beams are focused on a uniformly charged surface of the photosensitive element via optical components such as a polygon mirror and a lens and scan the surface of the photosensitive element in a main-scanning direction. Furthermore, the laser beams scan the photosensitive element in a sub-scanning direction based on image signals corresponding to each color along with the rotation of the photosensitive element, to write the image data on the surface of the photosensitive element thereby forming the electrostatic latent images.

In an optical scanning device used in such a tandem-type color-image forming apparatus, structural components are arranged such that each of the laser beams that heads towards a corresponding photosensitive element passes through a different path. Therefore, a sub-scanning position of each of the laser beams that performs scanning is likely to differ for each color (fluctuation in shape of scan lines, so-called bend of a scan line, inclination of a scan line, and a sub-scanning write position (sub-scanning registration position)), thereby causing a color shift.

Specifically, when using a relatively inexpensive plastic scanning imaging lens, a shape of the plastic scanning imaging lens can be changed due to a change in temperature conditions during resin molding or an individual difference in molds at the time of multicavity molding, and the color shift becomes more severe. Moreover, the scanning imaging lens undergoes thermal deformation due to an impact of environmental temperature at a place where the color-image forming apparatus is installed or temperature rise within the color-image forming apparatus. Thus, a position of the optical beam is likely to change.

If a timing to write the electrostatic latent images on the photosensitive elements is not accurately adjusted among respective colors, a registration position shift (sub-scanning registration shift) occurs, thereby causing the color shift.

In existing technologies, such a scanning position shift is periodically detected at the time of apparatus startup or between jobs, etc. by using a registration-position-shift detection pattern that is registered on a transfer body and correction is carried out based on a result of detecting the pattern. However, at the time of continuous print operation, the scanning position further changes due to heat generation of a fixing vessel or a motor that drives the polygon mirror. Thus, if a large number of prints are necessary in a job, the color shift gradually increases.

In a technology disclosed in Japanese Patent Application Laid-open No. 2007-298563, for energy saving of a light source system, the color-image forming apparatus includes a splitting unit that splits a light beam FO emitted from the light source into at least a light beam FM and a light beam FS, and a detection optical system that optically guides the split light beam FM to a detecting unit. In a vertical section in a direction of the light beam FO, an optical component proximal to a point that is an intensity peak of the light beam FO is included only in the light beam FS without being included in the light beam FM. Thus, the light beam becomes substantially circular or elliptical and the intensity peak is formed at the substantial center.

The peak portion of the light is supplied to outside and the remaining portion of the light is detected for controlling an optical intensity. Thus, the optical intensity can be controlled and light can be efficiently supplied to outside. Consequently, increase in light use efficiency, energy saving, and reduction in environmental load can be realized.

In an existing technology, to achieve high speed and high density in the optical scanning device, a multibeam writing using a surface-emitting-laser light source is disclosed. However, with this optical scanning device, because the optical intensity is relatively low and the intensity fluctuation is caused by an environmental change, some problems arise such as that an optical-intensity-correction control needs to be performed with high accuracy (for example, instead of a back monitor photodiode (PD) such as the one used in an edge-emitting laser unit, a front monitor PD is required).

As described in the technology mentioned earlier, in the color-image forming apparatus that splits the light beam and detects the optical intensity, detection efficiency is degraded. Specifically, in the surface-emitting laser unit in which sufficient optical intensity is hardly obtained from the light source, accuracy in optical-intensity detection is degraded.

SUMMARY OF THE INVENTION

It is an object of the present invention to at least partially solve the problems in the conventional technology.

According to an aspect of the present invention, there is provided an optical scanning device including a light source that emits a laser beam, the light source including a plurality of light-emitting units; a deflecting unit that deflects the laser beam from the light source in a main-scanning direction; a scanning imaging unit that focuses the laser beam deflected by the deflecting unit on a scanning surface and scans the scanning surface with focused laser beam; and a light receiving unit that detects optical intensity of the laser beam and a synchronous timing in the main-scanning direction, the light receiving unit including a plurality of photodetecting elements, and a substrate on which the photodetecting elements are arranged in the main-scanning direction.

Furthermore, according to another aspect of the present invention, there is provided an image forming apparatus that forms a latent image on an image carrier by optical scanning and develops the latent image to form a visible image on the image carrier and includes the above optical scanning device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention are explained below with reference to the accompanying drawings.

Figure 1:
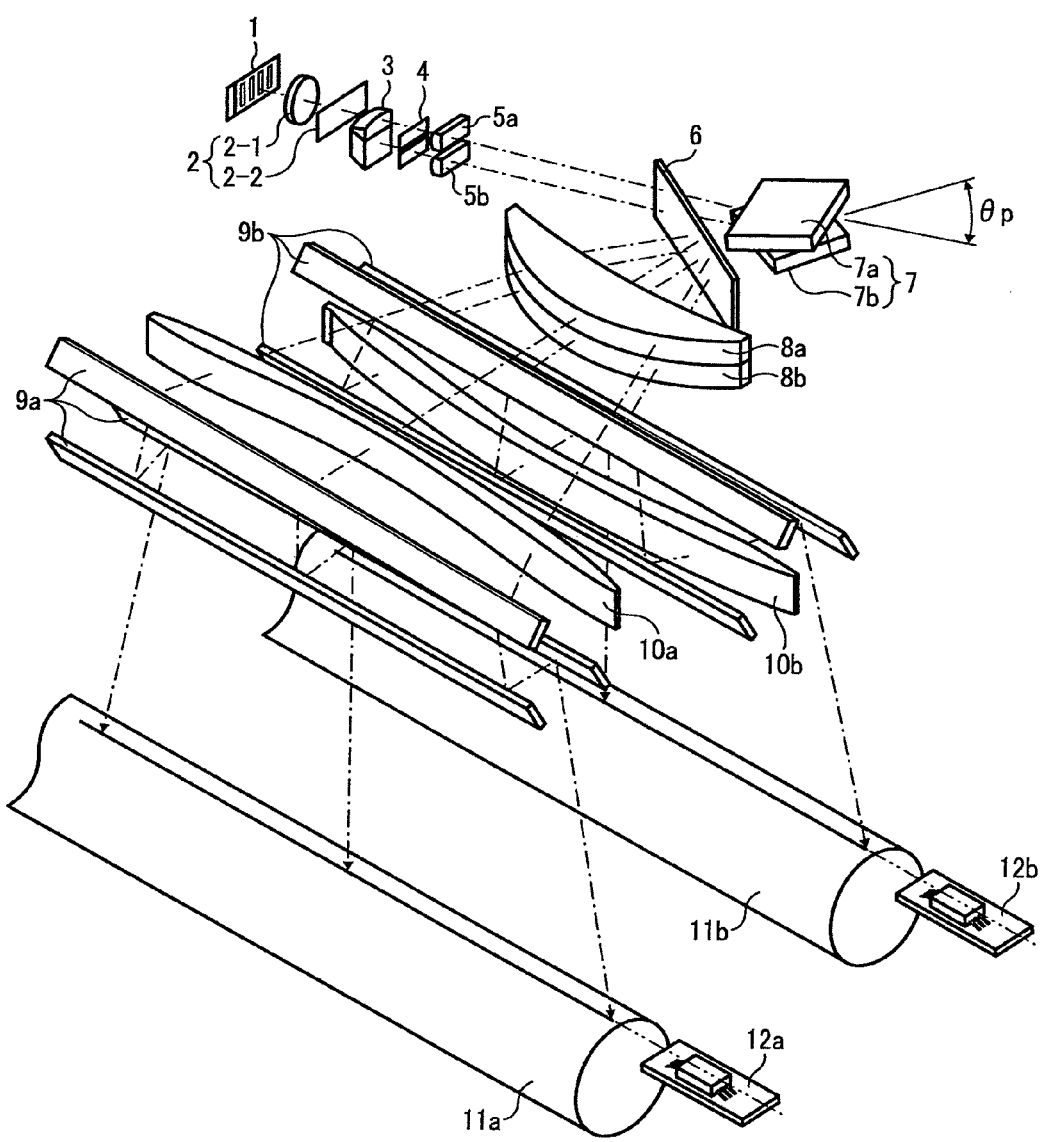
FIG. 1 is a perspective view of an optical scanning device according to a first embodiment of the present invention.
Figure 2:
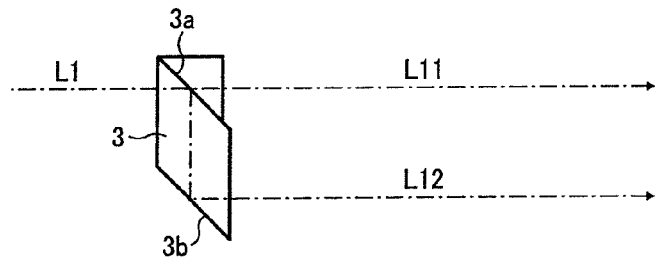
FIG. 2 is a schematic diagram for explaining beam splitting by using a half-mirror prism shown in FIG. 1.

FIG. 1 is a perspective view of an optical scanning device according to a first embodiment of the present invention. FIG. 2 is a schematic diagram for explaining beam splitting by using a half-mirror prism 3 shown in FIG. 1. As shown in FIG. 1, the optical scanning device includes a surface-emitting-laser light source 1 in which a plurality of light-emitting areas is two-dimensionally arranged, an optical component 2 that includes a coupling lens 2-1 and an aperture 2-2, the half mirror prism 3, a liquid-crystal deflection element 4, cylindrical lenses 5a and 5b, a soundproof glass 6, an optical deflector 7 formed of an upper polygon mirror 7a and a lower polygon mirror 7b, first scanning lenses 8a and 8b, optical-path bending mirrors 9a and 9b, second scanning lenses 10a and 10b, drum-shaped photosensitive elements 11a and 11b, and laser beam detectors 12a and 12b.

A laser beam L1, which is emitted from the surface-emitting-laser light source 1 that includes the two-dimensionally arranged light-emitting areas, is split in a sub-scanning direction into two beams of approximately equal optical intensity by using the half mirror prism 3. A laser beam (a laser beam L11 shown in FIG. 2), which passes straight through a semi-transparent mirror 3a of the half mirror prism 3, is reflected by the semitransparent mirror 3a and is incident on the cylindrical lens 5a. Furthermore, a laser beam (a laser beam L12 shown in FIG. 2) reflected by a reflective surface 3b is incident on the cylindrical lens 5b.

A plurality of laser beams is emitted from the surface-emitting-laser light source 1 (in FIGS. 1 and 2, a single laser beam is shown as a typical example). Each laser beam is split in the sub-scanning direction into two by the half mirror prism 3. Each split laser beam passes through the liquid-crystal deflection element 4, which is explained in detail later, and the cylindrical lenses 5a and 5b, and is incident on the optical deflector 7 via the soundproof glass 6. The laser beam deflected by the optical deflector 7 is emitted towards a scanning-imaging optical system via the soundproof glass 6.

As shown in FIG. 1, the optical deflector 7 includes the upper polygon mirror 7a and the lower polygon mirror 7b formed in two steps above and below in the sub-scanning direction (rotational shaft direction). The optical deflector 7 can be rotated around a rotational shaft by a driving motor (not shown).

The upper polygon mirror 7a and the lower polygon mirror 7b according to the first embodiment are identical in shape, and each of them includes four deflecting-reflecting surfaces. The deflecting-reflecting surfaces of the lower polygon mirror 7b make a predetermined angle θp (equal to 45 degrees (°)) with respect to the deflecting-reflecting surfaces of the upper polygon mirror 7a in a rotational direction.

The first scanning lens 8a, the second scanning lens 10a, and the optical-path bending mirror 9a together form a set of a scanning-imaging optical system that optically guides the laser beams deflected from the upper polygon mirror 7a to the photosensitive element 11a arranged at the corresponding optical scanning position and forms a plurality of optical spots split in the sub-scanning direction.

Similarly, the first scanning lens 8b, the second scanning lens 10b, and the optical-path bending mirror 9b together form a set of a scanning-imaging optical system that optically guides the laser beams deflected from the lower polygon mirror 7b to the photosensitive element 11b arranged at the corresponding optical scanning position and forms a plurality of optical spots split in the sub-scanning direction.

Thus, multi-beam scanning of the surface of the photosensitive element 11a is carried out by using the laser beams deflected by the upper polygon mirror 7a Similarly, multi-beam scanning of the surface of the photosensitive element 11b is carried out by using the laser beams deflected by the lower polygon mirror 7b.

Because the deflecting-reflecting surfaces of the upper polygon mirror 7a and the lower polygon mirror 7b form an angle of 45° with each other, when the laser beams deflected by the upper polygon mirror 7a carry out optical scanning of the photosensitive element 11a, the laser beams deflected by the lower polygon mirror 7b are not optically guided to the photosensitive element 11b. Similarly, when the laser beams deflected by the lower polygon mirror 7b carry out optical scanning of the photosensitive element 11b, the laser beams deflected by the upper polygon mirror 7a are not optically guided to the photosensitive element 11a. In other words, optical scanning of the photosensitive elements 11a and 11b is alternately carried out.

Figure 3A:
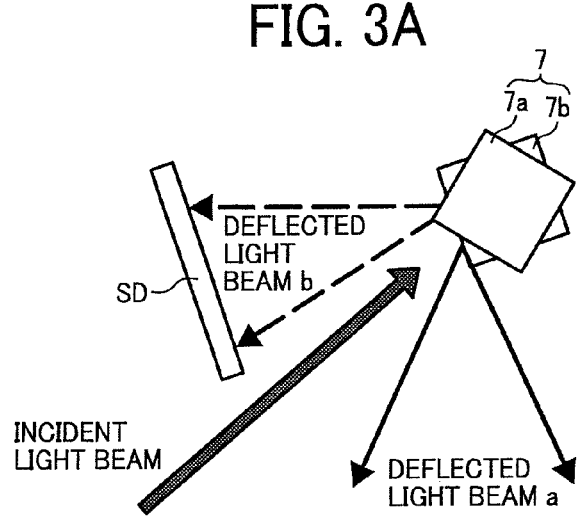
FIGS. 3A and 3B are schematic diagrams for explaining optical scanning on photosensitive elements according to the first embodiment.
Figure 3B:
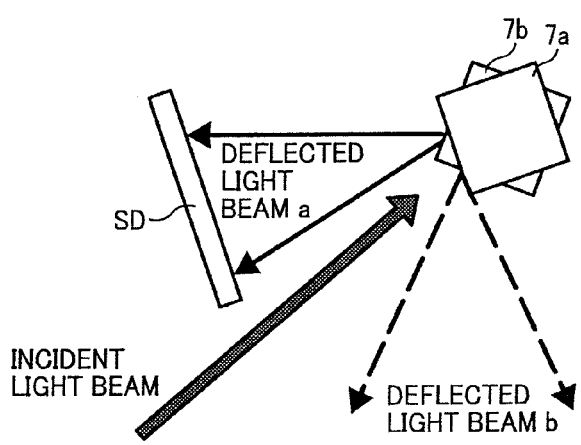

FIGS. 3A and 3B are schematic diagrams for explaining optical scanning on the photosensitive elements 11a and 11b. As shown in FIGS. 3A and 3B, for the sake of convenience, the laser beam (in reality, a plurality of laser beams) incident on the optical deflector 7 is indicated as an incident light beam and the deflected laser beams are indicated as deflected light beams "a" and "b".

FIG. 3A is a schematic diagram of a status when the incident light beam is incident on the optical deflector 7 and the deflected light beam "a", which is deflected by the upper polygon mirror 7a, is optically guided to the optical scanning position. When the deflected light beam "a" is optically guided to the optical scanning position, the deflected light beam "b", which is deflected by the lower polygon mirror 7b, does not proceed to the optical scanning position.

FIG. 3B is a schematic diagram of a status when the incident light beam is incident on the optical deflector 7 and the deflected light beam "b", which is deflected by the lower polygon mirror 7b, is optically guided to the optical scanning position. When the deflected light beam "b" is optically guided to the optical scanning position, the deflected light beam "a", which is deflected by the upper polygon mirror 7a, does not proceed to the optical scanning position.

When the deflected light beam deflected by one of the polygon mirrors is being optically guided to the optical scanning position, the deflected light beam deflected by the other one of the polygon mirrors may act as a ghost light beam. Therefore, as shown in FIGS. 3A and 3B, to prevent the deflected light beam from acting as the ghost light beam, suitably using a light shielding device SD is desirable to shield the deflected light beam that is not optically guided to the optical scanning position.

In the structure of the optical scanning device according to the first embodiment shown in FIG. 1, because multi-beam optical scanning of the photosensitive elements 11a and 11b is carried out alternately, for example, when the photosensitive element 11a is optically scanned, optical intensity of the light source is modulated by black image signals, and when the photosensitive element 11b is optically scanned, the optical intensity of the light source is modulated by cyan image signals. In this manner, a black electrostatic latent image and a cyan electrostatic latent image can be written to the photosensitive elements 11a and 11b, respectively.

Figure 4:
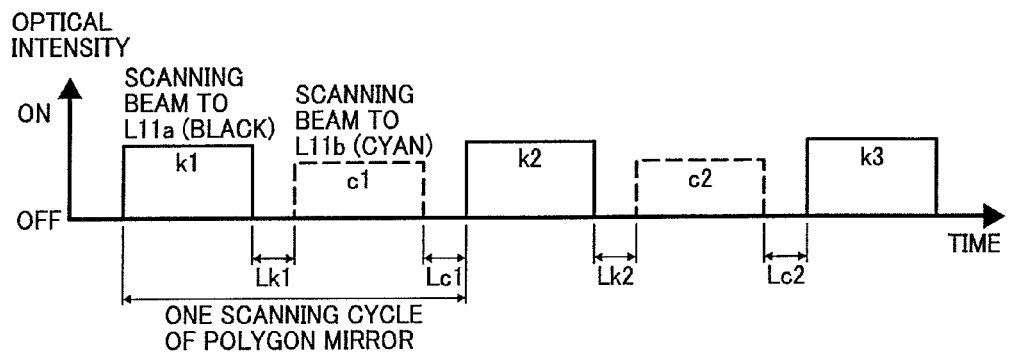
FIG. 4 is a timing chart for explaining black image writing and cyan image writing carried out by using a common light source according to the first embodiment.

FIG. 4 is a timing chart for explaining black image writing and cyan image writing when a common light source is used and an entire effective scanning area is lit up, according to the first embodiment.

As shown in FIG. 4, a solid line indicates a portion corresponding to the black image writing and a broken line indicates a portion corresponding to the cyan image writing. A main-scanning timing of the black image writing and the cyan image writing is determined when a laser beam that proceeds to an optical scanning start position is detected by using a synchronous detector arranged outside the effective scanning area. If luminescence intensity of the light source in a black-image-writing time domain and a cyan-image-writing time domain is set the same, and when there exists a relative difference in transmittance and reflectance of the optical elements on each optical path, which extends from the surface-emitting-laser light source 1 to the photosensitive elements 11a and 11b, the optical intensity of the laser beams arriving at each photosensitive element 11a and 11b varies. Thus, as shown in FIG. 4, by varying the luminescence intensity of the surface-emitting-laser light source 1 when optically scanning different photosensitive element surfaces, the optical intensity at the different photosensitive element surfaces becomes equal.

The laser beam detectors 12a and 12b shown in FIG. 1 form a light receiving unit that includes photodiodes (PD) that detect the optical intensity of the scanning laser beams, synchronous timing detection in the main-scanning direction, and the sub-scanning position, and an AMP circuit that amplifies a signal output from the corresponding PD etc, which is explained in detail with reference to FIGS. 5A to 8.

Figure 11:
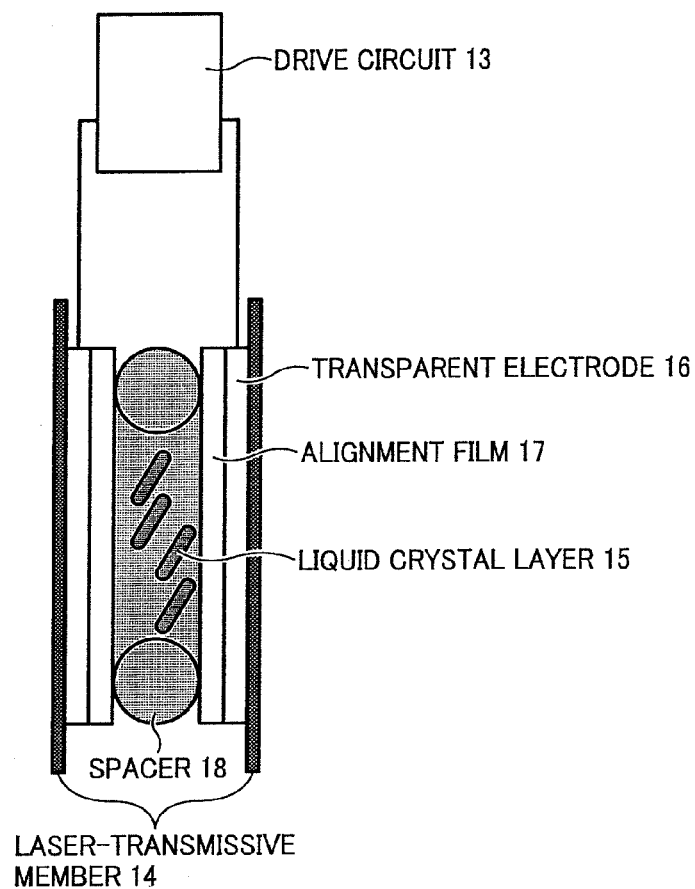
FIG. 11 is a schematic diagram for explaining a structure of a liquid-crystal deflection element shown in FIG. 1 according to the first embodiment.
Figure 12:
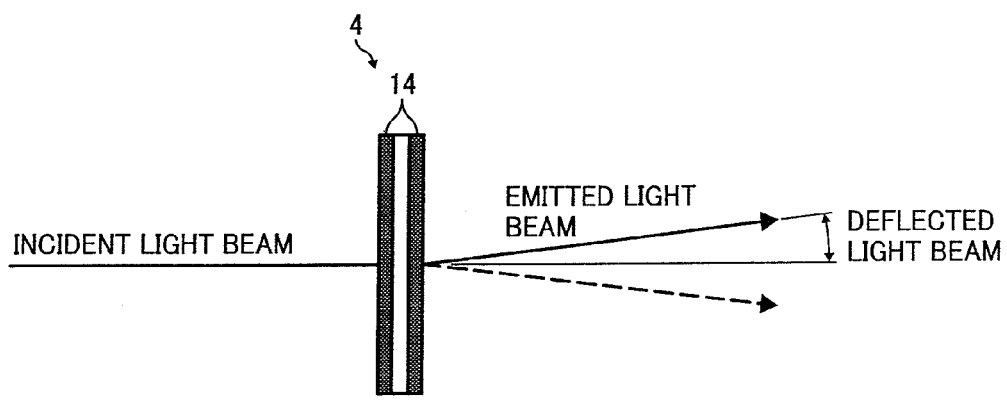
FIG. 12 is a schematic diagram of an incident light beam and an emitted light beam in the liquid-crystal deflection element shown in FIG. 11.

An internal structure of the liquid-crystal deflection element 4 is shown in FIG. 11. The liquid-crystal deflection element 4 includes a drive circuit 13, a laser-transmissive member 14, liquid crystal layers 15, a transparent electrode 16, an alignment film 17, spacers 18, etc. As shown in FIG. 12, the liquid-crystal deflection element 4 is an optical element that deflects the incident laser beam in the sub-scanning direction by causing the drive circuit 13 to input a rectangular or a sinusoidal voltage (when not operating, the incident laser beam passes through the liquid-crystal deflection element 4 without getting deflected).

The liquid-crystal deflection element 4 is controlled to drive based on the sub-scanning position detected by the laser beam detector 12a and the scanning laser beam is corrected to a desired sub-scanning position. For responding to the two split laser beams, the liquid-crystal deflection element 4 includes in the sub-scanning direction, two liquid-crystal deflection areas that can independently control the two laser beams. Therefore, the liquid-crystal deflection element 4 is preferably arranged on an emitting side of the half mirror prism 3.

As shown in FIG. 1, the laser beam detectors 12a and 12b are arranged at a position that is optically (specifically, fθ characteristic and the same hereinafter) equivalent to the laser beams that scan the surfaces of the photosensitive elements 11a and 11b. Although positioning the laser beam detectors 12a and 12b as extensions of the surfaces of the photosensitive elements 11a and 11b in the main-scanning direction is desirable, for the sake of convenience, the laser beam detectors 12a and 12b can be arranged such that the laser beams scan an inner side of the laser beam detectors 12a and 12b via reflecting mirrors.

When laser-beam scanning-position detection needs high accuracy, it is desirable that the laser beams that scan the surfaces of the photosensitive elements 11a and 11b, and the laser beams that scan the laser beam detectors 12a and 12b pass through the same optical element. If only the laser beams that scan the laser beam detectors 12a and 12b are allowed to pass through the reflecting mirrors, fluctuation in orientation of the reflecting mirrors may affect the detectors.

Figure 5A:
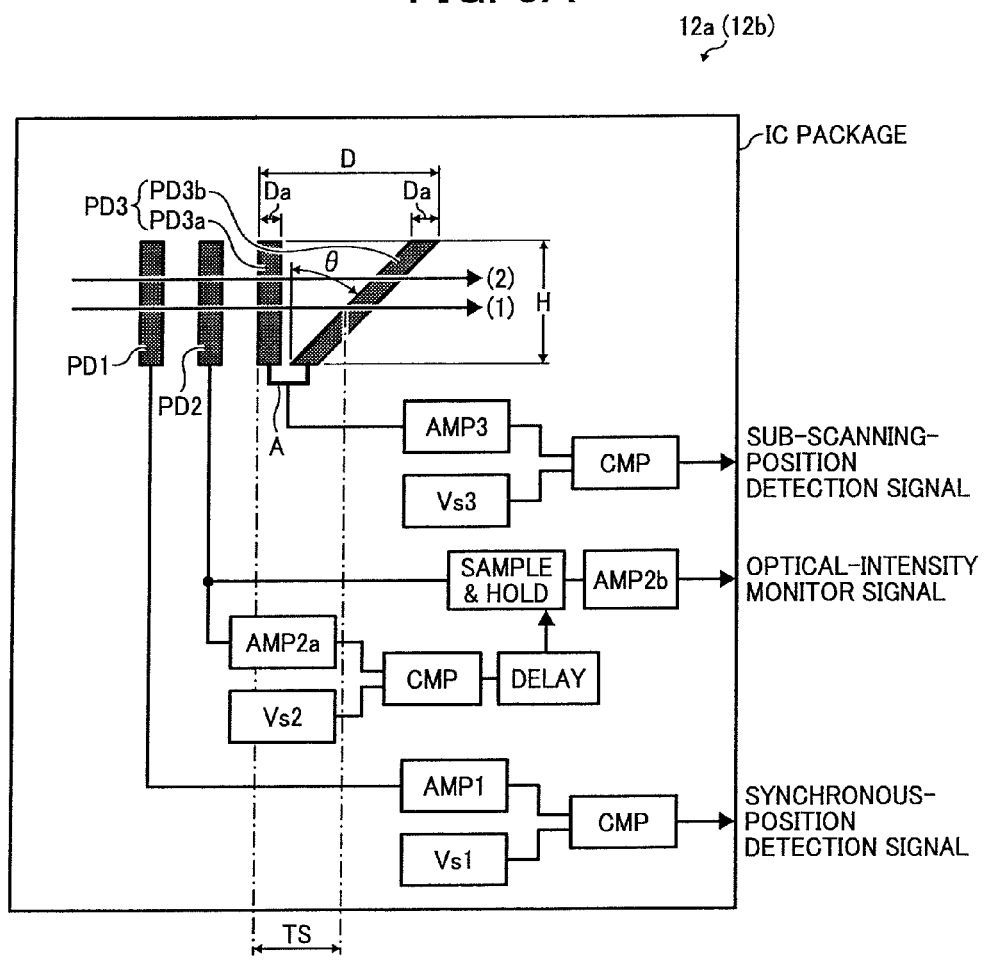
FIG. 5A is a schematic diagram of a laser beam detector according to the first embodiment.

FIG. 5A is a schematic diagram of the photodiodes and an integrated circuit (IC) that serve as the light receiving units (IC package, hereinafter photo IC) of the laser beam detectors 12a and 12b. A package material of the photo IC is formed of laser-transmissive material. The laser beam detectors 12a and 12b each includes the photo IC and a circuit board on which the photo IC is mounted.

As shown in FIG. 5A, the laser beam detectors 12a includes the photodiodes PD1 to PD3 (PD3a and PD3b), amplifiers AMP1, AMP2a, AMP2b, and AMP3, a comparator circuit CMP, a sample and hold circuit, and a delay circuit. In FIG. 5A, Vs1 to Vs3 indicate threshold voltages.

Sub-scanning position detection is explained with reference to FIG. 5A. The sub-scanning position detection is carried out by using the photodiode PD3, the amplifier AMP3 that amplifies output of the photodiode PD3, and the comparator circuit CMP that performs waveform shaping.

The photodiode PD3 includes photodiodes PD3a and PD3b that are two photo-receiving areas and are electrically connected by a circuit pattern or bonding (A unit), and can be treated as a single photodiode.

A periphery (scanning upstream-side edge) of the photodiode PD3a is arranged orthogonal (parallel to the sub-scanning direction) to the scanning beam and the other photodiode PD3b is arranged such that the periphery (scanning upstream-side edge) of the photodiode forms an angle θ with the sub-scanning direction. Consequently, the peripheries of the two photodiodes that lie next to each other form an angle θ with the sub-scanning direction.

Moreover, the two photo-receiving areas are arranged with an angle θ (0<θ<90°). The angle θ is preferably between 30° to 60°. In the first embodiment, the angle θ is 45°, which is the most appropriate example. If the angle θ is less than 30°, change in time interval (TS) reduces with respect to the scanning laser beam and detection sensitivity is degraded.

If the angle θ exceeds 60°, effective detection height H in the sub-scanning direction with respect to a total width D of the light-receiving surface in the main-scanning direction reduces. To secure the necessary effective detection height H, the total width D of the light-receiving surface increases and the light-receiving surface enters the image area, or the effective area of the optical system needs to be set wide and the scanning lens enlarges in size.

To overcome the drawbacks mentioned earlier, the effective detection height H in the sub-scanning direction is preferably set to 1 millimeter (mm) to 3 mm. The total width D of the light-receiving surface is preferably set to less than or equal to 5 mm. Moreover, setting the angle θ at 45° is most appropriate because the drawbacks mentioned earlier can be distributed in a balanced manner.

Dimensions of the rectangular photodiode PD3, which is longitudinal along the sub-scanning direction, are preferably 1 mm to 3 mm in the sub-scanning direction and 0.1 mm to 3 mm in the main-scanning direction. When the dimension in the sub-scanning direction is less than 1 mm, the photodiode becomes narrow and scanning by using the scanning beam within a photodiode range in an initial status (initially assembled state without being adjusted) becomes difficult because the sub-scanning position of the laser beam shifts initially by more than or equal to 1 mm due to an impact of variation in dimensional tolerance or mounting dimensional tolerance of the components of the optical elements in an unadjusted state. When the dimension in the sub-scanning direction exceeds 3 mm, the photodiode becomes too large in size, thus making it difficult to retain uniform sensitivity quality over the entire photodiode surface, decreasing yield rate, and increasing the cost.

On the other hand, the dimension in the main-scanning direction needs to be greater than 0.1 ($1/e^2$) mm that is a diameter of the scanning laser beam. Alternatively, if the dimension in the main-scanning direction is less than 0.1 mm, the optical intensity of the laser beam cannot be accurately detected. The dimension in the main-scanning direction exceeding 3 mm results in the drawbacks mentioned earlier.

Figure 5B:
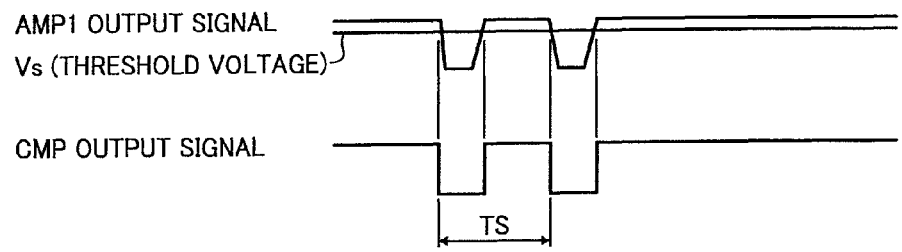
FIGS. 5B and 5C are waveforms output from each unit of the laser beam detector according to the first embodiment.

When the laser beam passes through the photodiodes PD3a and PD3b, the output signal of the timing chart shown in FIG. 5B is generated. A comparator signal is output by the passage of the laser beam and the time interval TS from one falling edge to another falling edge of two pulses depends on the sub-scanning position at which the laser beam carry out scanning. For example, when a position of a laser beam (1) changes to the position of a laser beam (2) and a time interval difference is ΔTS, a sub-scanning position variation Δh of the laser beam is calculated from Equation (1):

$$\Delta h = (v \times \Delta TS)/\tan \theta \quad (1)$$

where, v indicates a speed of the scanning laser beam.

Because face tangle and jitter component are present in the polygon mirrors 7a and 7b, an error (variation) is generated in the time interval. In the first embodiment, the following countermeasures are taken to prevent deterioration of detection precision due to error.

Figure 6A:
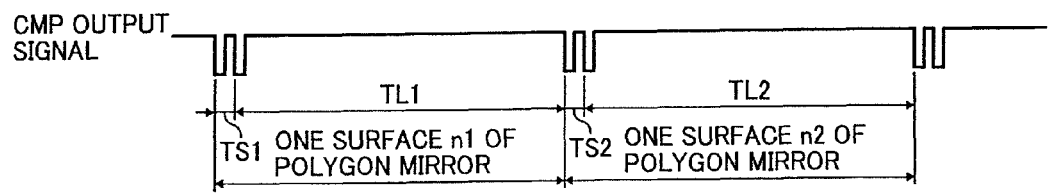
FIG. 6A is a schematic diagram of a CMP output signal at the time of continuous rotation of polygon mirrors.

FIG. 6A is a schematic diagram of a portion of the comparator circuit CMP output signal obtained from the continuously rotating polygon mirrors 7a and 7b. The time interval includes TS (a time interval from the photodiodes PD3a to PD3b) when scanning the inside of the laser beam detector and TL (a time interval from the photodiodes PD3b to PD3a that is scanned on the next polygon mirror surface). A ratio of TS to TL is determined by a scanning width, number of rotations (scanning speed) of the polygon mirror, etc., and a predominant ratio is (TS:TL=1:200 to 400).

Figure 6B:
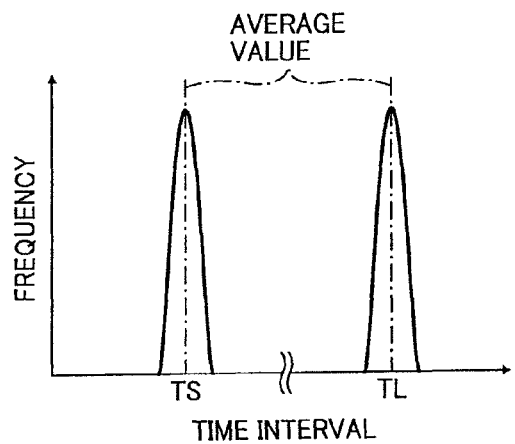
FIG. 6B is a histogram of time intervals during the continuous rotation of the polygon mirrors.

FIG. 6B is a histogram of the time intervals TS and TL. To reduce the impact of time interval fluctuation due to the polygon mirrors 7a and 7b, a time-interval measurement data is sequentially stored in a memory unit, divided into two groups of the time intervals TS and TL, and an average value of a shorter time interval is determined as the sub-scanning position of the laser beam. A method of easily segregating the shorter time interval (TS) is explained below. For segregating TS, an intermediate time interval between TS and TL is calculated by utilizing a great difference (TS:TL=1:200 to 400), which is mentioned earlier, in the intervals of the two groups (TS and TL), and a filter is added.

For example, when degree of the ratio is TS:TL=1:2, an error is likely to occur during a measuring time of each of TS and TL, and accuracy in extracting TS is lowered in the filter that is based on simple averaging.

Measuring only a specific surface results in the following drawbacks. As described in the first embodiment, preferably the time interval of an entire peripheral surface of the polygon mirror is treated as the measurement data. When face tangle, mirror surface damage, dent or flatness (to a degree that does not affect the image) of the specific surface differ greatly from any other surface, the laser beam deflector is affected and accuracy in detecting the sub-scanning position is likely to deteriorate.

Considering the fluctuation component, the greater a time-interval measurement sample number, the better. However, because more detection time is required, the sample number is preferably less than or equal to scan frequency in image formation (a time during which the light source of the optical scanning device is emission-controlled based on image signals and a no image-formation time (between print pages) between the next image formation) performed by an image forming apparatus. Practically, the sample number for averaging TS is preferably around 100 to 500. The sample number is preferably an even multiple of the number of polygon mirror surfaces (the sample number for one polygon mirror surface is two (TS and TL) because the face tangle and the jitter have cycles of one rotation (total peripheral surface) of the polygon mirror).

An optical intensity detection, which is carried out by the photodiode PD2 that detects the optical intensity, is explained next.

First, the scanning laser beam is detected by using the synchronous-timing detecting photodiode PD1. Based on a detection signal timing (after a fixed time interval), luminous spots at which optical intensity is to be detected are lit up when scanning the optical-intensity detecting photodiode PD2 and the scanning laser beam is caused to scan the photodiode PD2.

Figure 10A:
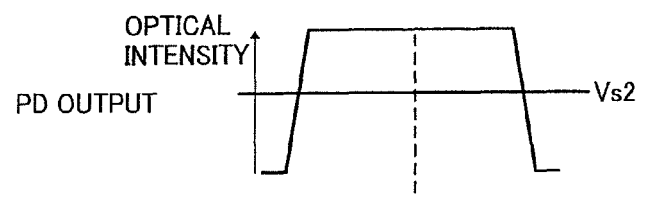
FIGS. 10A to 10D are schematic diagrams of signals output from each unit of the laser beam detector according to the first embodiment.
Figure 10B:
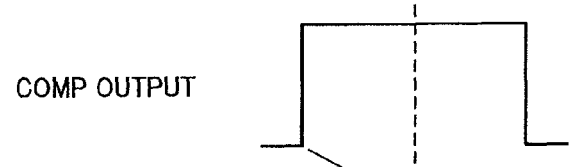
Figure 10C:
Figure 10D:
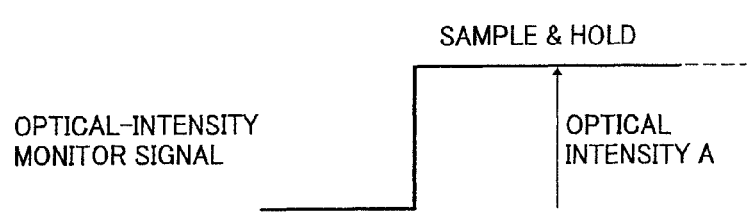

An optical-intensity monitor signal shown in FIG. 10A is output depending on the optical intensity of the scanned laser beam. To obtain a signal that retains a PD output central peak, sample hold is carried out by using the comparator circuit CMP and the delay circuit (see FIGS. 10B and 10C), and the optical-intensity monitor signal is generated (see FIG. 10D). Based on a detected monitor optical intensity, driving current of the light source is fed back and the optical intensity is corrected.

The synchronous-timing detecting PD is arranged on an upstream side of the optical-intensity detecting PD because the optical intensity of the surface-emitting laser unit is relatively low. Therefore, to attain the level at which a detection signal from the synchronous-timing detecting PD can be obtained, it is necessary to emit light from the already determined luminous spots and raise the optical intensity up to a detectable level. Furthermore, based on synchronous timing detection results, a fixed period is required until the luminous spots for which optical intensity control is carried out are determined.

Figure 7:
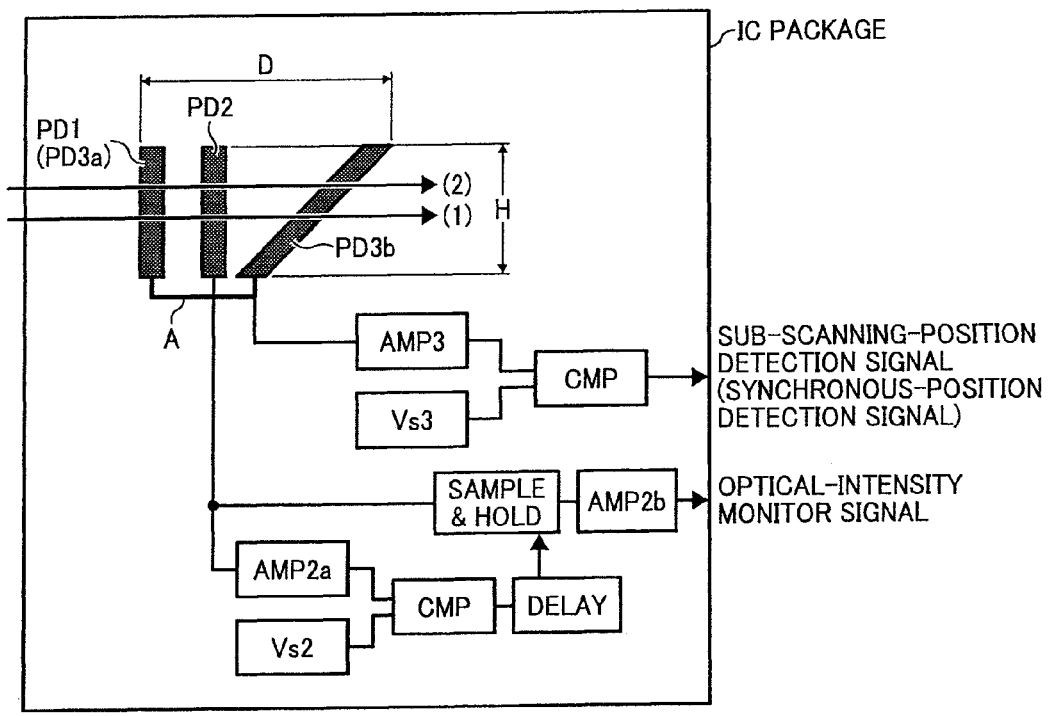
FIG. 7 is a schematic diagram of another laser beam detector according to the first embodiment.
Figure 8:
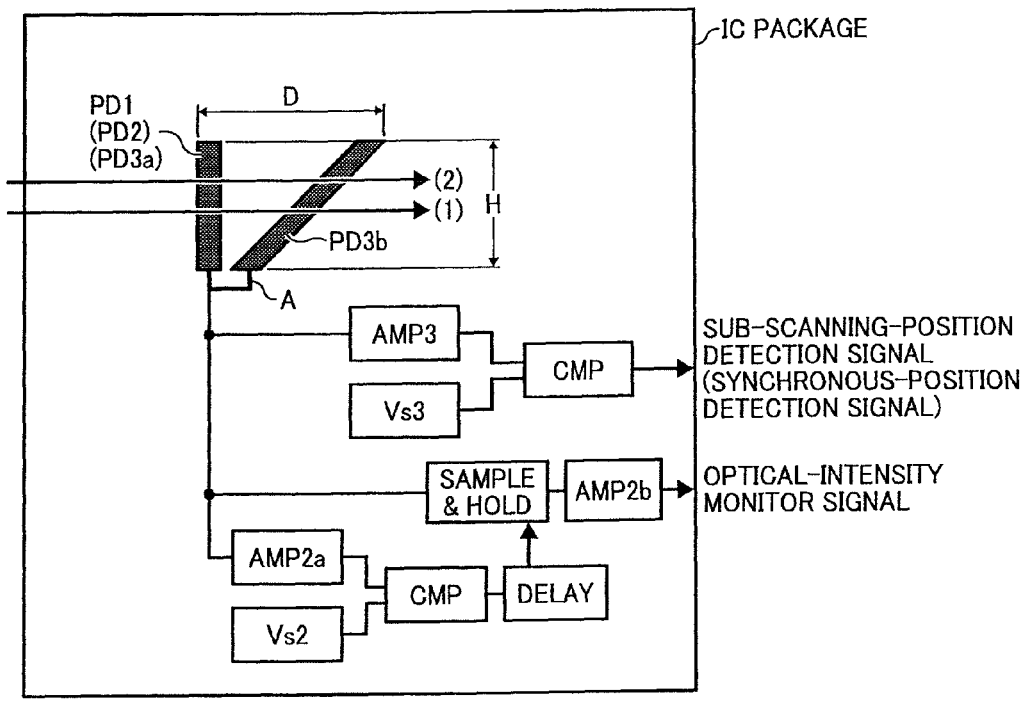
FIG. 8 is a schematic diagram of yet another laser beam detector according to the first embodiment.

Additionally, by arranging the photodiodes from the scanning direction upstream side in a sequence of the synchronous-timing detecting PD, the optical intensity detecting PD, the sub-scanning position detecting PD, the identical photodiodes PD (PD1, PD2, and PD3a) can be arranged next to each other as in the laser beam detector shown in FIGS. 7 and 8, thus small size and low cost can be realized.

A structural example of the laser beam detector that performs the synchronous timing detection, the optical intensity detection, and the sub-scanning position detection is described earlier. However, as shown in FIG. 9, a structure of the laser beam detector can be such that the sub-scanning position detecting photodiode PD3 is removed from the structure of the laser beam detector shown in FIG. 5A.

Figure 9:
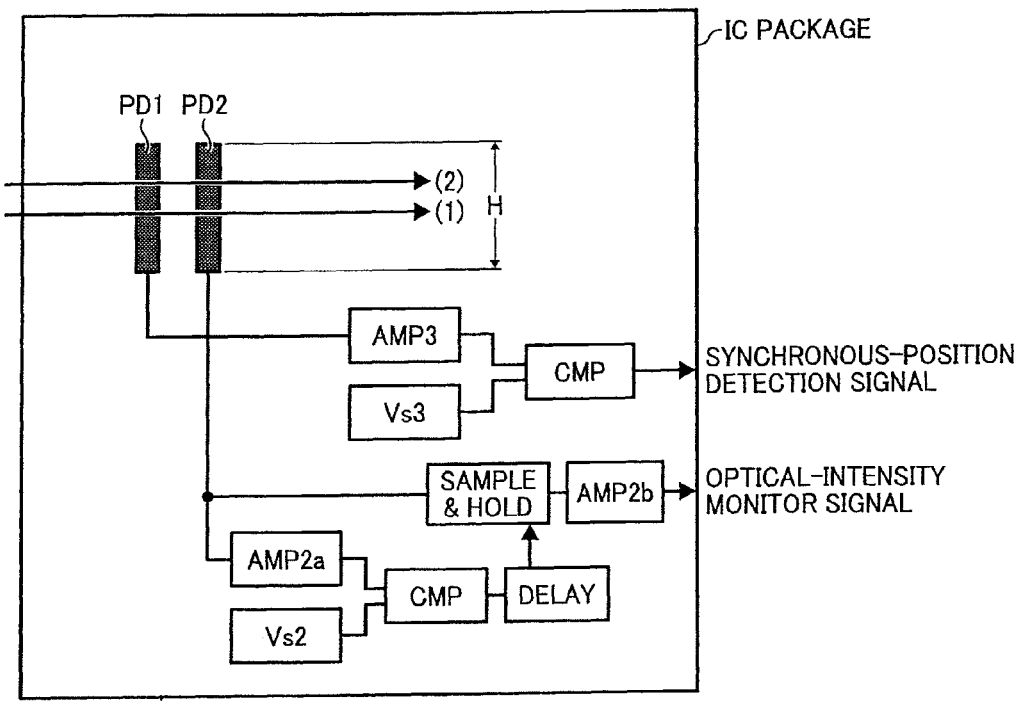
FIG. 9 is a schematic diagram of yet another laser beam detector according to the first embodiment.

In the structure of the laser beam detector shown in FIG. 9, the photodiode PD1 that outputs a synchronous position detection signal is arranged on the upstream side of the scanning direction and a plurality of the photodiodes PD2 that outputs signals for monitoring the optical intensity is arranged on a downstream side in the main-scanning direction. To obtain adequate synchronous signals in the photodiode PD1, the optical intensity is increased (for example, more than or equal to 50 microwatt (μW)) in the timing during which the photodiode PD1 is scanned, and the optical intensity in PD2 is set to be the same as the optical intensity (5 μW) on an image surface of the photosensitive element, etc. by using the light source and a light-source driving controller. Thus, because a suitable optical intensity can be set in each of the photodiode PD1 and the photodiode PD2, a plurality of light receiving elements is arranged in the main-scanning direction.

Because the surface-emitting laser unit of the light source according to the first embodiment passes through the optical elements, the optical intensity is extremely low. Therefore, optical-intensity fluctuation detection requires, for example, a fixed time integral and takes longer time. Thus, according to a second embodiment of the present invention explained with reference to FIG. 13, a structure of the optical scanning device includes a control system that combines the detection that is based on the optical intensity of transmitted light and the detection that is based on the light reflected by an aperture mirror, and corrects fluctuation in optical intensity of the light source etc., for every given fixed time interval.

Figure 13:
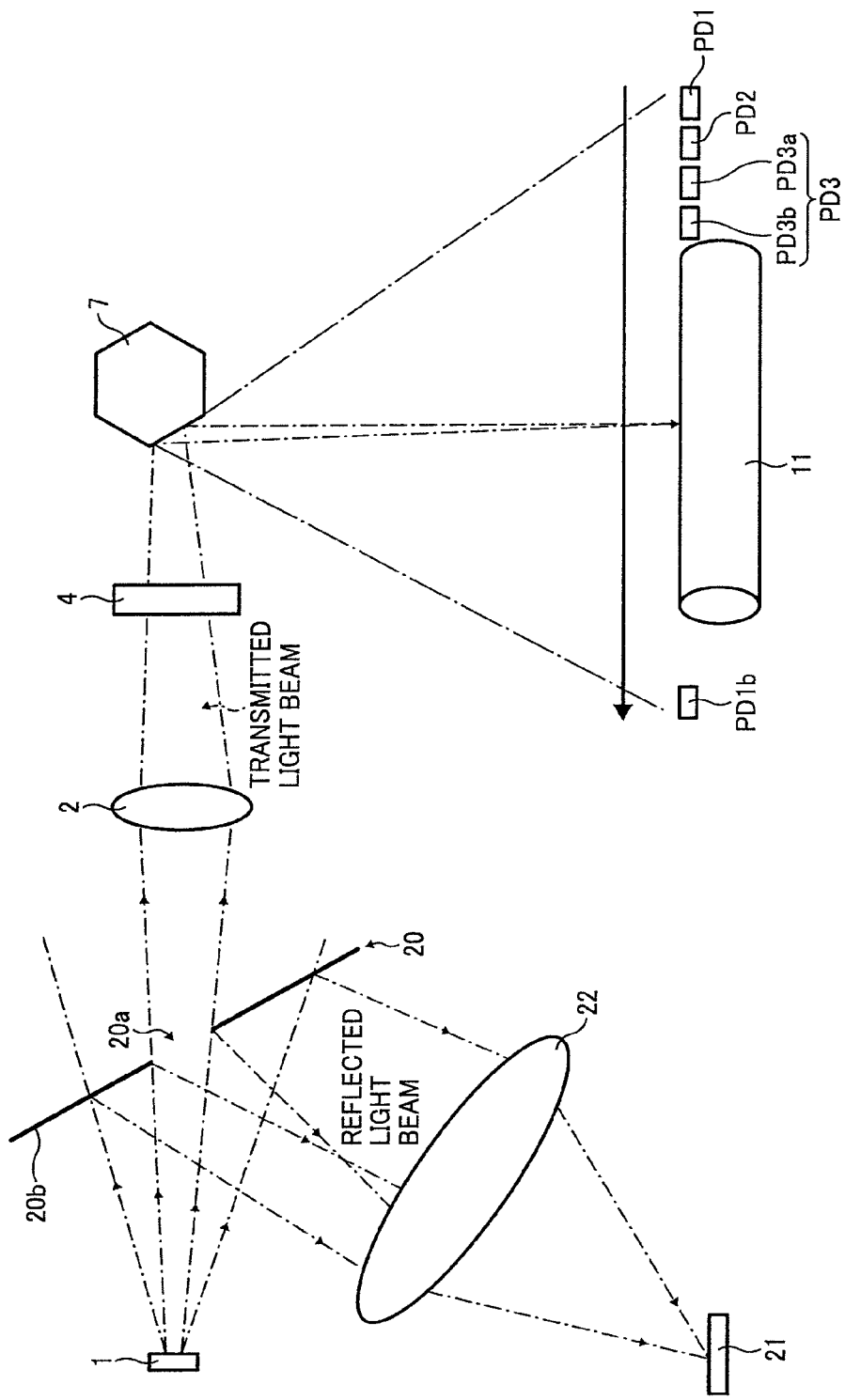
FIG. 13 is a schematic diagram of an optical scanning device according to a second embodiment of the present invention.

In FIG. 13, components that correspond to the components explained in FIG. 1 carry identical reference symbols and the detailed explanation thereof is omitted. As shown in FIG. 13, the optical scanning device includes a synchronous (front-end synchronous) timing detecting photodiode PD1a, a synchronous (rear-end synchronous) timing detecting photodiode PD1b, an aperture mirror 20 that includes an aperture 20a in a central portion, a monitoring photodiode (PD) 21, and a condensing lens set 22 in front of the monitoring PD 21.

In the second embodiment, the aperture mirror 20 is arranged such that the aperture mirror 20 separates the optical path between the surface-emitting-laser light source 1 and the coupling lens 2 according to the first embodiment. The aperture mirror 20 includes the aperture 20a, through which the laser beam passes, and a light reflecting unit 20b as a light shielding unit. The aperture mirror 20 optically guides a portion of the laser beam to the monitoring PD 21 by using the light reflecting unit 20b.

When suppressing the optical intensity to extend the life of the surface-emitting-laser light source 1 formed of the surface-emitting laser units, the optical intensity detection of the light (the laser beam that reaches a scanning surface side) transmitted via the aperture 20a is preferably combined with the monitoring PD 21 that uses the light reflected by the light reflecting unit 20b. If fluctuation in divergence angle is assumed, the detection results of the optical-intensity monitoring PD2 have higher accuracy than the results detected by the monitoring PD 21, and a suitable control is exercised based on mutual optical-intensity detection results.

A concept of correction control exercised according to the second embodiment is explained below.

Because the optical intensity of the light source is equal to the sum of the intensity of light transmitted via the aperture and the optical intensity of light reflected by the aperture, a temporal fluctuation in the optical intensity of the light source and the divergence angle of the light source may change depending on the optical intensity, a modulation method, temperature conditions, etc. When the optical intensity of the light source and the divergence angle of the light source change, for example, if the optical intensity of the light source is assumed as A and the optical intensity of the transmitted light as X, the optical intensity of the reflected light would be (A-X). If it is assumed that, due to temperature conditions, when the optical intensity of the light source changes to B, if the optical intensity of the transmitted light becomes (X+ΔX), it can be controlled to an original predetermined volume X by setting the optical intensity of the light source to satisfy B×X/(X+ΔX).

Upon assuming that the optical intensity of the transmitted light becomes (X+ΔX) due to fluctuation in the divergence angle, it can be secured at the original predetermined X by setting the optical intensity to satisfy A×X/(X+ΔX) because the original optical intensity of the light source remains as A.

The photodiode PD1a (PD1b) carries out synchronous timing detection in the main-scanning direction. The synchronous timing detection is similar to the sub-scanning direction that uses the amplifier AMP1 and the comparator circuit CMP, and therefore an explanation thereof is omitted.

As shown in FIG. 7, similar to the photodiodes PD1 and PD3a, the photodiode PD1a can be shared with the photodiode PD3a. Thus, sharing enables low cost and compact size. When the photodiodes are shared, each photodiode is arranged from the scanning upstream side in the sequence of the synchronous-timing detecting PD, the optical-intensity detecting PD, and the sub-scanning position detecting PD. For example, by sharing the position of the photodiodes PD1a and PD3a, the photodiode PD3a becomes unnecessary, enabling to reduce the size and cost. Moreover, also by sharing the circuit, an initial pulse signal of the TS signal can be processed as the synchronous signal and sharing the circuit further reduces the size and the cost.

As shown in FIG. 8, the photodiodes PD2 and PD1a (PD3a) can be shared similarly to the photodiodes PD2 and PD1 (PD3), thus enabling further reduction in the size and the cost.

Figure 5C:
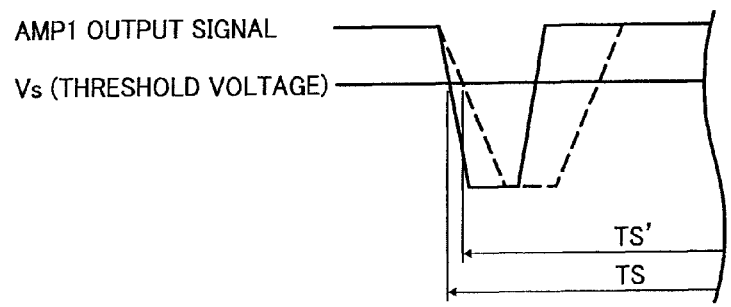
Figure 14A:
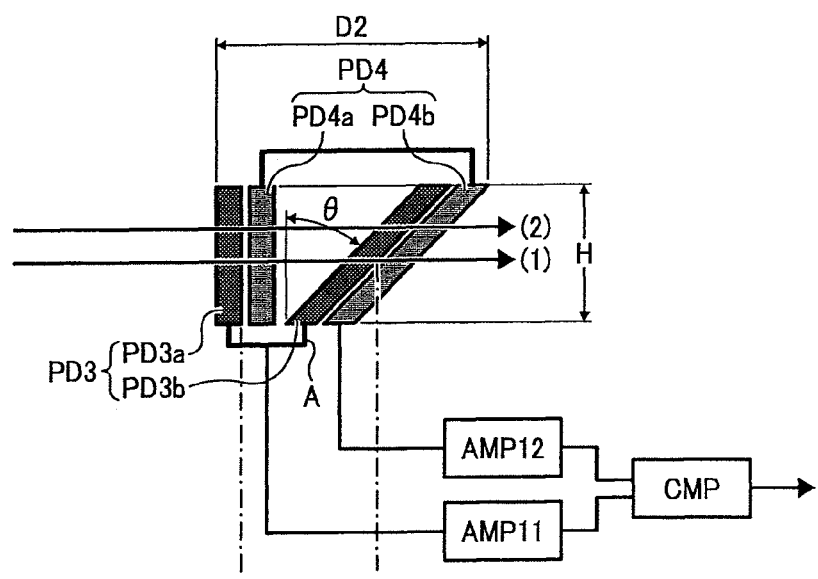
FIG. 14A is a schematic diagram of another laser beam detector according to the second embodiment.
Figure 14B:
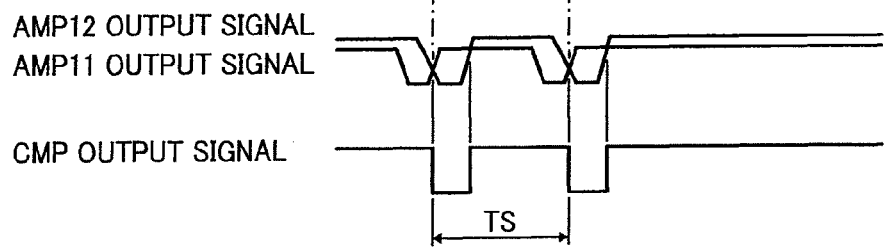
FIG. 14B is a waveform output from each unit of the laser beam detector.

FIGS. 14A and 14B are schematic diagrams of a modified example of the photodiode PD3 that is the sub-scanning position detector explained in FIGS. 5A to 5C.

In FIG. 14A, the photodiode PD3 (PD3a and PD3b) is a first-system photodiode, a photodiode PD4 (PD4a and PD4b) is a second-system photodiode, and D2 is a maximum width (total width in the main-scanning direction) of the photodiodes. The remaining components are the same as in the structural example shown in FIGS. 5A to 5C. The first-system photodiode PD3 and the second-system photodiode PD4 are arranged next to each other in the main-scanning direction, and each of the photodiodes PD3 and PD4 is divided into two light-receiving areas formed non-parallel to each other in the area through which the laser beams pass together. Respective divided areas of the photodiodes PD3 and PD4 are arranged next to each other, and the adjacent peripheries are formed linearly parallel to each other.

After carrying out current voltage conversion and voltage amplification by using amplifiers AMP11 and AMP12, respectively, voltage comparison is carried out by using the comparator circuit CMP, and the output signal is output when an output signal level of the amplifier AMP12 drops as compared to the output signal level of the amplifier AMP11. Thus, by detecting a cross point of the amplifiers AMP11 and AMP12, although the optical intensity of the laser beams fluctuates, high-accuracy detection can be carried out without any adverse effects. For enabling high-accuracy detection, an adjacent interval between the second-system photodiodes in the main-scanning direction is set smaller than the diameter of the laser beam that passes through.

FIG. 14B is a timing chart of the output signals of the laser beam detectors 12a and 12b (see FIG. 1) when the laser beam has passed through the photodiodes PD3 and PD4. Two pulses are output when the laser beam passes the photodiodes PD3 and PD4. The time interval TS from one falling edge to another falling edge of the two pulses depends on the sub-scanning position at which the laser beam carries out scanning. Similarly to the structural example shown in FIGS. 5A to 5C, the sub-scanning position variation Δh can be calculated from Equation (1).

The laser beam detector 12a (12b) is movable in the sub-scanning direction. For example, the laser beam detector 12a (12b) is fixed to a holder (not shown) and the holder can be moved in the sub-scanning direction using a screw mechanism. In this mechanism, initial adjustment is carried out during manufacturing (assembly) process of the optical scanning device such that the scanning beam is approximately at the center of a sub-scanning detection area H of the photodiodes inside the laser beam detector.

Because the position of the laser beam in the sub-scanning direction may fluctuate on the upstream side or the downstream side of the sub-scanning direction due to thermal environment change, as much as possible, a detection range needs to be maintained equally on the upstream side and on the downstream side of the sub-scanning direction. Therefore, the scanning beam is positioned approximately at the center of the sub-scanning detection area H of the photodiodes. Because maintaining the scanning beam position exactly at the exact center is difficult, preferably the center is adjusted within an area range of 1/10 of the sub-scanning detection area H that is detectable.

Detection of a change in the sub-scanning position of the laser beam is explained next. A standard time interval, which is a value corresponding to the scanning position of the laser beam at the time of factory shipment or correction start, is already stored in the memory unit as standard position data, a difference between the time interval detected by the laser beam detector and the standard time interval is calculated, thereby enabling detection of the change in the sub-scanning position of the laser beam.

Because the standard position serves as a sub-scanning position data that forms a base of correction control, the standard position is extremely important. In the laser beam detector, for example, the measurements are carried out at least three times. Preferably, if any one of the measurements is considerably different from other sub-scanning position data (greater than the sum of an average of at least three measurements and a standard deviation σ), the sub-scanning position data is deleted, measurements are carried out again, checking is carried out again, and the resulting data is determined as the standard position.

The structure of the optical scanning device according to the second embodiment includes the surface-emitting laser light source that includes the laser beams of each color that simultaneously carry out scanning. Incidence of the laser beams on all the photodiodes that are arranged inside the laser beam detector 12a (12b) is corrected as explained below.

Figure 15B:
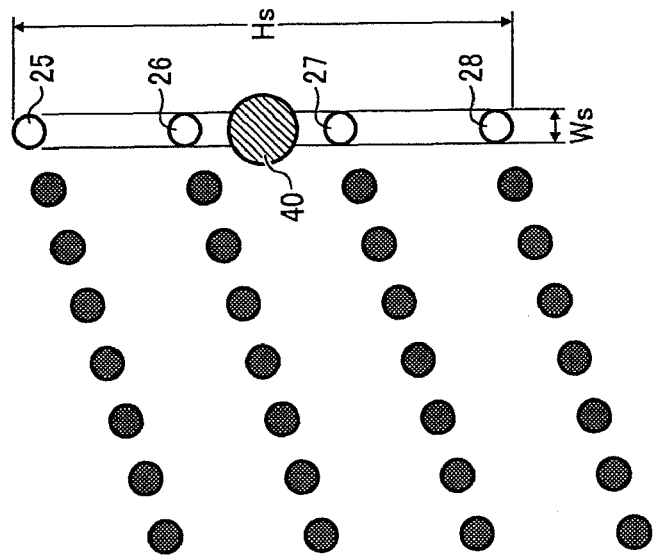
FIGS. 15A and 15B are schematic diagrams for explaining moderation of incidence of laser beams on photodiodes according to the second embodiment.
Figure 15A:
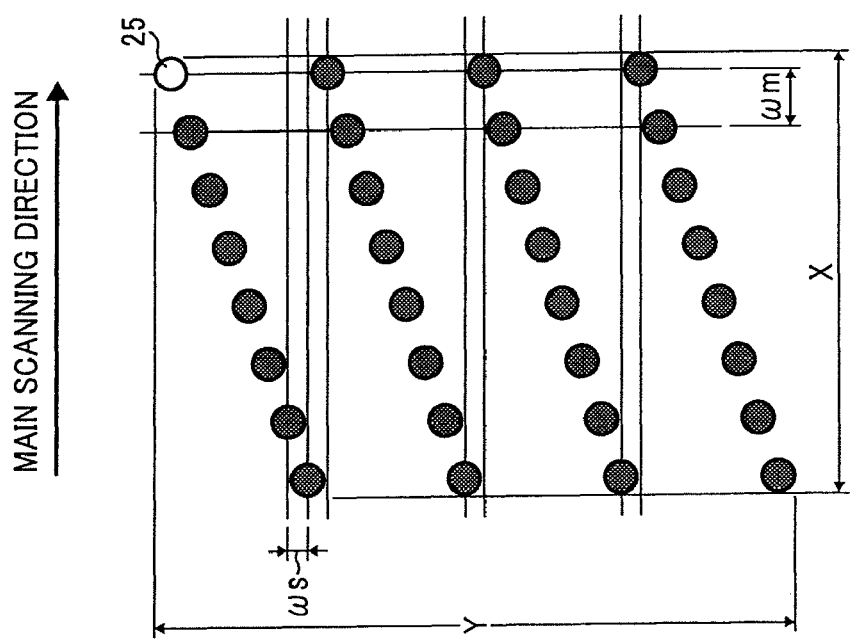

FIGS. 15A and 15B are two-dimensional arrays of the laser beams on the scanning surfaces when the laser beams are at rest, in which ωm is a beam pitch in the main-scanning direction, and ωs is the beam pitch in the sub-scanning direction. Each of the beam pitches ωm and ωs is equal between the beams. Each array is a 32-beam array that includes four rows of obliquely arranged eight beams. The 32 beams indicate light-emitting areas (electrically connected enabling emission of light). A white circle shown in FIGS. 15A and 15B indicates a place that is actually lit up by turning on the power, and a black circle indicates a place that is not lit up. Furthermore, X indicates the width of the light-emitting area in the main-scanning direction and Y indicates the width of the light-emitting area in the sub-scanning direction.

As shown in FIG. 15A, although an image is formed on the scanning surface using the surface-emitting laser unit and scanning is performed inside the photodiode PD1 by the laser beam having the optical intensity the same as that of a laser beam (a light-emitting area) 25 that scans as the optical spot, the optical intensity becomes inadequate (does not attain threshold voltage indicated in FIG. 5B) and the CMP signal is not output. In the surface-emitting laser unit, although the two-dimensional array is easily arranged and a plurality of beams is easily configured on the array, the optical intensity for each beam is low (although the driving current necessary for increasing the optical intensity is passed, element life decreases considerably due to excessive temperature rise) and the laser beam shown in FIG. 15B cannot detect the sub-scanning position even after scanning the light-receiving area of the laser beam detector.

FIG. 15B is a schematic diagram for explaining a solution to the drawback mentioned earlier. Four light-emitting areas 25 to 28 that form a row in the sub-scanning direction are lit at the time of scanning the inside of the photodiode and treated as a set of laser beams. Thus, the optical intensity can be increased (simply four times by using four beams) compared to the optical intensity in the existing technology and the optical intensity that attains the threshold voltage can be secured. A gravity center position 40 of the four scanning laser beams 25 to 28 is shown in FIG. 15A, which is the sub-scanning detection position. Although the sub-scanning position of the gravity center position 40 differs from that of the light-emitting area 25, because a variation amount of the gravity center position 40 and the variation amount of the light-emitting area 25 are equal, the variation amount of the position of the light-emitting area 25 can be detected by detecting the variation amount of the sub-scanning position.

As shown in FIG. 5C, an output waveform (solid line) of the photodiode can affect the time interval TS. For example, apart from reduction (time degradation) in reflectance and transmittance of the optical elements, when the number of rotations of the optical deflector is reduced (the optical deflector rotates with the number of rotations reduced by 50 percent due to the variation from 1200 dots per inch (dpi) to 600 dpi) for responding to variation in pixel density at the time of image formation, the waveform appears as the output waveform indicated with a dashed line. Thus, a falling edge time up to the threshold voltage, which determines comparator output, prolongs (gradient becomes gentle) forming a time interval TS' and incorrect detection is carried out due to variation in the sub-scanning position.

The falling edge time is correlated with an integral amount of the optical intensity of light incident on the photodiode (optical intensity integral amount). By exerting control such that the integral optical intensity integral amount becomes constant, the drawback mentioned earlier can be solved.

Arrangement of the photodiodes PD1$a$ and PD1$b$ inside the photo IC is explained below. As shown in FIGS. 5A to 5C, preferably the photo IC is arranged on a central side of the scanning area of the image such that the periphery of the photodiode is orthogonal (parallel to the sub-scanning direction) to the scanning beam. Because the laser beam detector is arranged outside the scanning area of the image, if six deflecting-reflecting surfaces are used as in the existing technology, the scan angle is low and the optical characteristic is degraded. In the second embodiment, although degradation of the optical characteristics is low with four deflecting-reflecting surfaces that can secure a greater scan angle, degradation is not completely eliminated. Therefore, the laser beam detector should desirably be arranged as near to the scan area of the image as possible.

Figure 16:
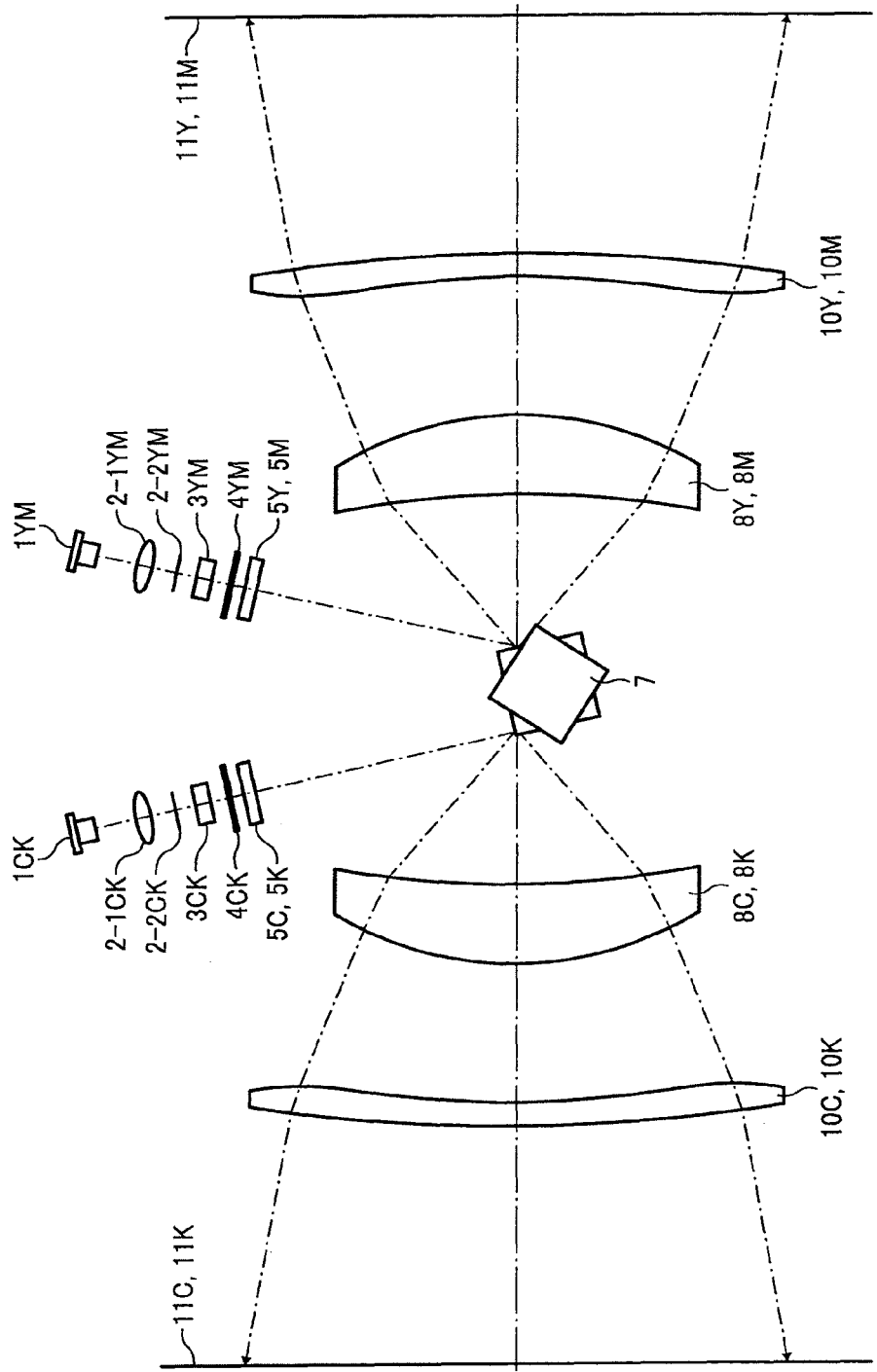
FIG. 16 is a plan view of tandem-type optical scanning devices that correspond to four colors and that are included in a color-image forming apparatus according to the second embodiment.

FIG. 16 is a plan view of a tandem-type optical scanning devices that are included in the color-image forming apparatus according to the second embodiment. As shown in FIG. 16, the optical scanning devices scan four scanning surfaces that correspond to four colors of the scanning laser beams and are arranged to oppose each other with the optical deflector 7 therebetween. In FIG. 16, the optical components of the optical scanning devices are viewed from the sub-scanning direction, in other words, a rotational shaft direction of the optical deflector 7. For the sake of convenience, the optical-path bending mirror on the optical path extending from the optical deflector 7 to the optical scanning position is abbreviated in FIG. 16 such that the optical path becomes linear.

As shown in FIG. 16, four photosensitive elements 11Y, 11M, 11C, and 11K are arranged at the optical scanning positions and the electrostatic latent images formed on the photosensitive elements are individually visualized by using magenta, yellow, cyan, and black toners to form color images.

Semiconductor laser (surface-emitting laser) units 1YM and 1CK emit one laser beam each. The semiconductor laser unit 1YM performs intensity modulation alternately using image signals corresponding to yellow images and image signals corresponding to magenta images. Furthermore, the semiconductor laser unit 1CK performs intensity modulation alternately using image signals corresponding to cyan images and image signals corresponding to black images.

The laser beam (although a plurality of laser beams is emitted in reality, only one laser beam is plotted for the sake of convenience) emitted from the semiconductor laser unit 1YM is collimated using a coupling lens 2-1YM, beam shaping is carried out after the laser beam passes through an aperture 2-2YM, the laser beam is incident on a half mirror prism 3YM, and split into two laser beams separated in the sub-scanning direction. The structure of the half mirror prism 3YM is the same as the structure of the half mirror prism 3 shown in FIG. 2. One portion of the split laser beam is used for writing the yellow images and the other portion is used for writing the magenta images.

The two laser beams, which are split in the sub-scanning direction, are controlled by a liquid-crystal deflection element 4YM such that the sub-scanning position is corrected if necessary, each laser beam is focused in the sub-scanning direction by using cylindrical lenses 5Y and 5M (arranged overlapping each other in the sub-scanning direction) arranged in the sub-scanning direction, and incident on the optical deflector 7.

The structure of the optical deflector 7 is the same as the structure that is explained with reference to FIGS. 1 and 3. The optical deflector 7 includes polygon mirrors unified in two steps in the rotational shaft direction. Each of the polygon mirrors includes four deflecting-reflecting surfaces and the mutually deflecting-reflecting surfaces of the polygon mirrors are deviated in the rotational shaft direction. A long linear image is formed by using the cylindrical lenses 5Y and 5M in the main-scanning direction close to a deflecting-reflecting surface position of each polygon mirror.

The laser beam deflected by the optical deflector 7 passes through first scanning lenses 8Y and 8M and second scanning lenses 10Y and 10M, respectively, the optical spots are formed on the photosensitive elements 11Y and 11M by the action of the lenses and the photosensitive elements 11Y and 11M are optically scanned.

Similarly, the laser beam emitted from the semiconductor laser unit 1CK is collimated using a coupling lens 2-1CK, beam shaping is carried out after the laser beam passes through an aperture 2-2CK, the laser beam is incident on a half mirror prism 3CK, and split into two laser beams separated in the sub-scanning direction. The structure of the half mirror prism 3CK is the same as the structure of the half mirror prism 3YM. One portion of the split laser beam is used for writing the cyan images and the other portion is used for writing the black images.

The two laser beams that are split in the sub-scanning direction are focused in the sub-scanning direction by using cylindrical lenses 5C and 5K (arranged overlapping each other in the sub-scanning direction), respectively, that are arranged in the sub-scanning direction. Consequently, the split laser beams are incident on the optical deflector 7 and deflected. Furthermore, each laser beam passes through first scanning lenses 8C and 8K and second scanning lenses 10C and 10K, respectively, the optical spots are formed on the photosensitive elements 11C and 11K by the action of the lenses, and the photosensitive elements are optically scanned.

Figure 17:
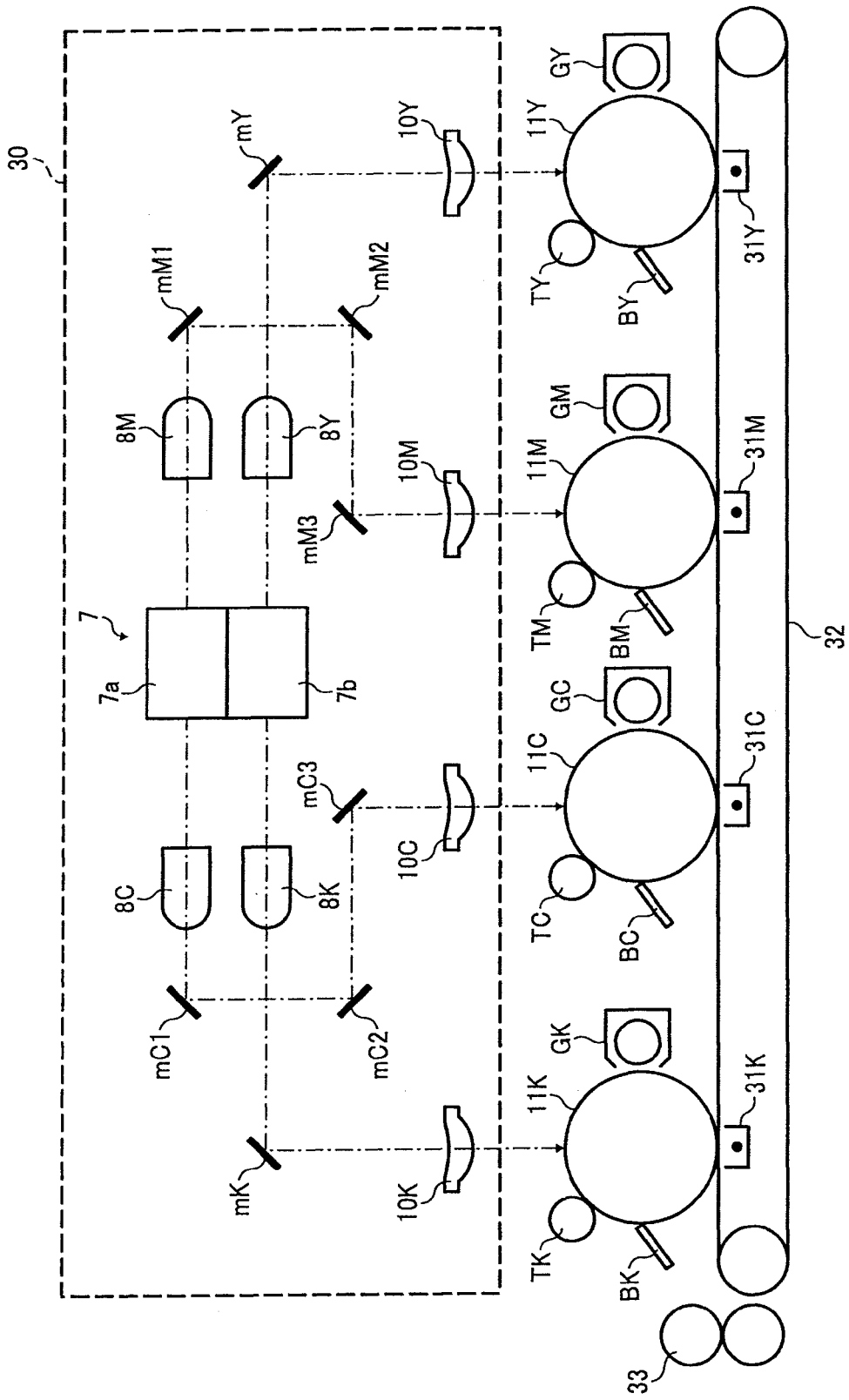
FIG. 17 is a schematic diagram of the color-image forming apparatus according to the second embodiment.

FIG. 17 is a schematic diagram of the color-image forming apparatus according to the second embodiment explained with reference to FIG. 16. An optical scanning device 30 includes a scanning-imaging optical system of four color units (yellow, magenta, cyan, and black) for color printing and the laser beams corresponding to each color are focused on the photosensitive elements 11K, 11C, 11M, and 11Y.

One of the laser beams that is deflected by the upper polygon mirror 7a of the optical deflector 7 is guided to the photosensitive element 11M that is actually the optical scanning position from the optical path that is bent using optical-path bending mirrors mM1, mM2, and mM3. The other laser beam is guided to the photosensitive element 11C that is actually the optical scanning position from the optical path that is bent using optical-path bending mirrors mC1, mC2, and mC3.

Similarly, one of the laser beams that is deflected by the lower polygon mirror 7b of the optical deflector 7 is guided to the photosensitive element 11Y that is actually the optical scanning position from the optical path that is bent using optical-path bending mirrors mY1, mY2, and mY3. The other laser beam is guided to the photosensitive element 11K that is actually the optical scanning position from the optical path bent using optical-path bending mirrors mK1, mK2, and mK3.

Consequently, the laser beams emitted from the two semiconductor laser units 1YM and 1CK are split into two laser beams by the half mirror prisms 3YM and 3CK, respectively, to form laser beams of four colors, and the four color laser beams optically scan the four photosensitive elements 11Y, 11M, 11C, and 11K. The photosensitive elements 11Y and 11M are alternately optically scanned by using the laser beam that is emitted from the semiconductor laser unit 1YM and split into two laser beams in the sub-scanning direction along with the rotation of the optical deflector 7. Similarly, the photosensitive elements 11C and 11K are alternately optically scanned by using the laser beam that is emitted from the semiconductor laser unit 1CK and split into two laser beams in the sub-scanning direction along with the rotation of the optical deflector 7.

The photosensitive elements 11Y to 11K are rotated clockwise with a constant velocity, uniformly charged by charging rollers TY, TM, TC, and TK that form a charging unit, and color images of each of the four colors yellow, magenta, cyan, and black are written by receiving the optical scanning of the laser beams corresponding to each photosensitive element, whereby corresponding electrostatic latent images (mega images) are formed.

Reversal development of the electrostatic latent images is carried out by each developing device GY, GM, GC, and GK and a yellow toner image, a magenta toner image, a cyan toner image, and a black toner image are formed respectively on the photosensitive elements 11Y, 11M, 11C, and 11K.

The toner image of each color is transferred onto printing sheets. Specifically, a printing sheet is conveyed by a conveying belt 32 and the yellow toner image is transferred from the photosensitive element 11Y onto the printing sheet by using a transfer device 31Y. Similarly, the magenta toner image, the cyan toner image, and the black toner image are sequentially transferred from the respective photosensitive elements 11M, 11C, and 11K onto the printing sheet by using transfer devices 31M, 31C, and 31K.

Thus, a composite image is formed by superimposing the yellow toner image to the black toner image on the printing sheet. Then, a color image is obtained by fixing the composite image onto the printing sheet by using a fixing device 33.

According to an aspect of the present invention, it is possible to provide a relatively small and low-cost optical scanning device capable of performing scanning with high density and high speed.

Furthermore, according to another aspect of the present invention, it is possible to provide a relatively small and low-cost image forming apparatus capable of forming high-quality images.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
    a light source that emits a laser beam, the light source including a plurality of light-emitting units that are two-dimensionally arranged;
    an optical element that splits the laser beam emitted from the light source into first and second split light beams;
    a deflecting unit that deflects the split light beams in a main-scanning direction, and wherein the optical element is arranged on an optical path from the light source to the deflecting unit;
    a scanning imaging unit that focuses the split light beams deflected by the deflecting unit on respective first and second scanning surfaces and scans the scanning surfaces with respective focused laser beams; and
    first and second integrated circuit packages that each include a light receiving unit that detects optical intensity of the respective laser beam and a synchronous timing in the main-scanning direction, and wherein the light receiving units each include photodetecting elements and a substrate on which the photodetecting elements are arranged in the main-scanning direction, and wherein the first and second light receiving units detect the first and second split light beams, respectively; and
    wherein the light receiving units further detect sub-scanning positions of the respective laser beams; and
    wherein the photodetecting elements include a common photodetecting element that functions as a first photodetecting element for detecting the optical intensity of the respective laser beam, a second photodetecting element for detecting the synchronous timing, and a part of a third photodetecting element for detecting the sub-scanning position.

2. The optical scanning device according to claim 1, wherein the photodetecting elements include a common photodetecting element that functions as a first photodetecting element for detecting the optical intensity of the respective laser beam and a second photodetecting element for detecting the synchronous timing.

3. The optical scanning device according to claim 1, wherein the photodetecting elements include a first photodetecting element for detecting the optical intensity of the respective laser beam, a second photodetecting element for detecting the synchronous timing, and a third photodetecting element for detecting the sub-scanning position, and the first photodetecting element, the second photodetecting element, and the third photodetecting element are arranged in order from an upstream side of a scanning.

4. The optical scanning device according to claim 1, wherein each light receiving unit is sealed with a laser-transmissive member.

5. The optical scanning device according to claim 1, further comprising a control unit that controls the optical intensity of the light source by correcting a driving current of the light source based on a result of detecting the optical intensity and controls a sub-scanning position of the respective laser beam by performing at least one of selection of light-source lighting points and adjustment of lighting timing based on a result of detecting the subscanning position.

6. An optical scanning device comprising:
- a light source that emits a laser beam, the light source including a plurality of light-emitting units that are two-dimensionally arranged;
- an optical element that splits the laser beam emitted from the light source into first and second split light beams;
- a deflecting unit that deflects the split light beams in a main-scanning direction, and wherein the optical element is arranged on an optical path from the light source to the deflecting unit;
- a scanning imaging unit that focuses the split light beams deflected by the deflecting unit on respective first and second scanning surfaces and scans the scanning surfaces with respective focused laser beams; and
- first and second integrated circuit packages that each include a light receiving unit that detects optical intensity of the respective laser beam and a synchronous timing in the main-scanning direction, and wherein the light receiving units each include photodetecting elements and a substrate on which the photodetecting elements are arranged in the main-scanning direction, and wherein the first and second light receiving units detect the first and second split light beams, respectively; and
- wherein the light receiving units further detect sub-scanning positions of the respective laser beams; and
- wherein the photodetecting elements include a first photodetecting element for detecting the sub-scanning position of the laser beam, the first photodetecting element includes two-line photodetecting units in which at least one of the two-line photodetecting units includes two photodetecting parts arranged in a nonparallel manner in a laser-beam passing area, and the two-line photodetecting units are arranged in the main-scanning direction such that adjacent edges lie parallel to each other.

7. An image forming apparatus that forms a latent image on an image carrier by optical scanning and develops the latent image to form a visible image on the image carrier, the image forming apparatus comprising:
- first and second cylindrical photosensitive elements; and
- an optical scanning device comprising:
    - a light source that emits a laser beam, the light source including a plurality of light-emitting units that are two-dimensionally arranged;
    - an optical element that splits the laser beam emitted from the light source into first and second split light beams;
    - a deflecting unit that deflects the split light beams in a main-scanning direction, and wherein the optical element is arranged on an optical path from the light source to the deflecting unit;
    - a scanning imaging unit that focuses the split light beams deflected by the deflecting unit on respective first and second scanning surfaces and scans the scanning surfaces with respective focused laser beams; and
    - first and second integrated circuit packages that each include a light receiving unit that detects optical intensity of the respective laser beam and a synchronous timing in the main-scanning direction, and wherein the light receiving units each include photodetecting elements and a substrate on which the photodetecting elements are arranged in the main-scanning direction, and wherein the first and second light receiving units detect the first and second split light beams, respectively; and
    - wherein the light receiving units further detect sub-scanning positions of the respective laser beams; and
    - wherein the photodetecting elements include a common photodetecting element that functions as a first photodetecting element for detecting the optical intensity of the respective laser beam, a second photodetecting element for detecting the synchronous timing, and a part of a third photodetecting element for detecting the sub-scanning position.

8. The image forming apparatus of claim 7, further comprising a light shielding device for shielding a ghost beam deflected by said deflecting unit.

9. The image forming apparatus of claim 8, wherein said integrated circuit packages include amplifiers located on said substrates for receiving signals from said photodetecting elements.

* * * * *